US007254469B2

(12) United States Patent
Robb et al.

(10) Patent No.: US 7,254,469 B2
(45) Date of Patent: Aug. 7, 2007

(54) SUPERIMPOSING CURRENT OR PREVIOUS GRAPHING DATA FOR ANOMALY DETECTION

(75) Inventors: Michael J. Robb, San Jose, CA (US); William Welch, Shanghai (CN); James Panko, Wonderlake, IL (US)

(73) Assignee: Snap-On Incorporated, Pleasant Prairie, WI (US)

( * ) Notice: Subject to any disclaimer, the term of this patent is extended or adjusted under 35 U.S.C. 154(b) by 274 days.

(21) Appl. No.: 10/990,546

(22) Filed: Nov. 18, 2004

(65) Prior Publication Data

US 2006/0106509 A1 May 18, 2006

(51) Int. Cl.
*G06F 7/00* (2006.01)
*G06F 17/00* (2006.01)

(52) U.S. Cl. .............................. 701/29; 701/33; 701/35; 702/71; 702/74

(58) Field of Classification Search ................... 701/29, 701/33, 35, 101–102, 115; 73/116; 307/1–4; 702/71, 74
See application file for complete search history.

(56) References Cited

U.S. PATENT DOCUMENTS

| 3,978,470 A | | 8/1976 | McGuire |
| 5,627,757 A | * | 5/1997 | Comignaghi et al. ....... 701/103 |
| 6,640,166 B2 | | 10/2003 | Liebl et al. |
| 2002/0077779 A1 | | 6/2002 | Liebl et al. |
| 2002/0077781 A1 | | 6/2002 | Liebl et al. |
| 2004/0064226 A1 | | 4/2004 | Lipscomb et al. |

FOREIGN PATENT DOCUMENTS

| JP | 60-178315 | 9/1985 |
| JP | 09-304115 | 11/1997 |

* cited by examiner

*Primary Examiner*—Y. Beaulieu
(74) *Attorney, Agent, or Firm*—McDermott Will & Emery LLP (57) ABSTRACT

A system and a machine-implemented method for rendering, on a display device, a first data graph concerning data received from a first data source. A second data graph concerning data received from a second data source is rendered on the display device, and superimposed onto the first data graph to generate a superimposed data graph.

44 Claims, 9 Drawing Sheets

SUPERIMPOSING CURRENT OR PREVIOUS GRAPHING DATA FOR ANOMALY DETECTION

TECHNICAL FIELD

This disclosure relates to vehicular diagnostic data analysis systems and methodologies and, more particularly, to vehicular diagnostic data analysis systems and methodologies that allow for the superimposition of data from multiple data sources.

BACKGROUND

When diagnosing problems, technicians often use modem test equipment that provides the technician with graphical representations of data concerning the system being analyzed. For example, when analyzing the ignition system of a vehicle, an automotive technician is typically provided with data graphs representing the ignition signal (provided by the ignition system) to each of the vehicle's spark plugs. These data graphs may be displayed sequentially (i.e., one spark plug at a time) or simultaneously (i.e., all spark plugs at the same time). Further, in addition to ignition signals, other data signals may be monitored (e.g., coolant temperature signals, emission control signals, and fuel injector signals, for example), and it is often desirable to simultaneous display these signals so that the signals can be compared and their interaction researched.

SUMMARY OF THE DISCLOSURE

In one implementation, a method includes rendering, on a display device, a first data graph concerning data received from a first data source. A second data graph concerning data received from a second data source is rendered on the display device, and superimposed onto the first data graph to generate a superimposed data graph.

One or more of the following features may also be included. Additional data graphs may be rendered on the display device, each of which concerns data received from an additional data source, and superimposed onto the first data graph. The x-axis of the first data graph, the x-axis of the second data graph, and the x-axis of the superimposed data graph are each divided into increments having a common time unit value.

The y-axis of the first data graph may be divided into increments having a first increment unit value, the y-axis of the second data graph may be divided into increments having a second increment unit value, and the y-axis of the superimposed data graph may be divided into increments having both the first increment unit value and the second increment unit value.

Superimposing the second data graph may include repositioning the second data graph onto the first data graph to generate the superimposed data graph. Superimposing the second data graph may include rendering a menu structure, on the display device, that allows the user to select the second data graph for superimposition onto the first data graph to generate the superimposed data graph.

An external control system that collects the data received from the first and second data sources may be interfaced. The external control system may be an electronic control unit of a motor vehicle. At least one of the data sources may be a sensor incorporated into the motor vehicle. One or more of the data graphs may be stored on a local or remote data store. One or more of the data graphs may be retrieved from the data store.

The first data source may be a baseline data file for a specific data sensor, and the second data source may be an actual data source from the specific data sensor. The baseline data file may be retrieved from a local or remote data store.

In another implementation, a method includes rendering, on a display device, a plurality of data graphs, each of which concerns data received from a different data source. A single data graph is selected from the plurality of data graphs, and at least a portion of the remaining plurality of data graphs are superimposed onto the selected single data graph to generate a superimposed data graph.

In another implementation, a superimposition system includes a display device for displaying a first data graph concerning data received from a first data source, and a second data graph concerning data received from a second data source. A selection device allows for the superimposition of the second data graph onto the first data graph to generate a superimposed data graph.

One or more of the following features may also be included. The display device may be configured to display additional data graphs, each of which concerns data received from an additional data source. The selection device may be configured to allow for the superimposition of the additional data graphs onto the first data graph. An interface device may interface with an external control system that collects the data received from the first and second data sources. A data store may store one or more of the data graphs.

The above-described methods may also be implemented as a sequence of instructions executed by a processor.

The details of one or more implementations are set forth in the accompanying drawings and the description below. Other features and advantages will become apparent from the description, the drawings, and the claims.

DETAILED DESCRIPTION OF THE EMBODIMENTS

Figure 1:
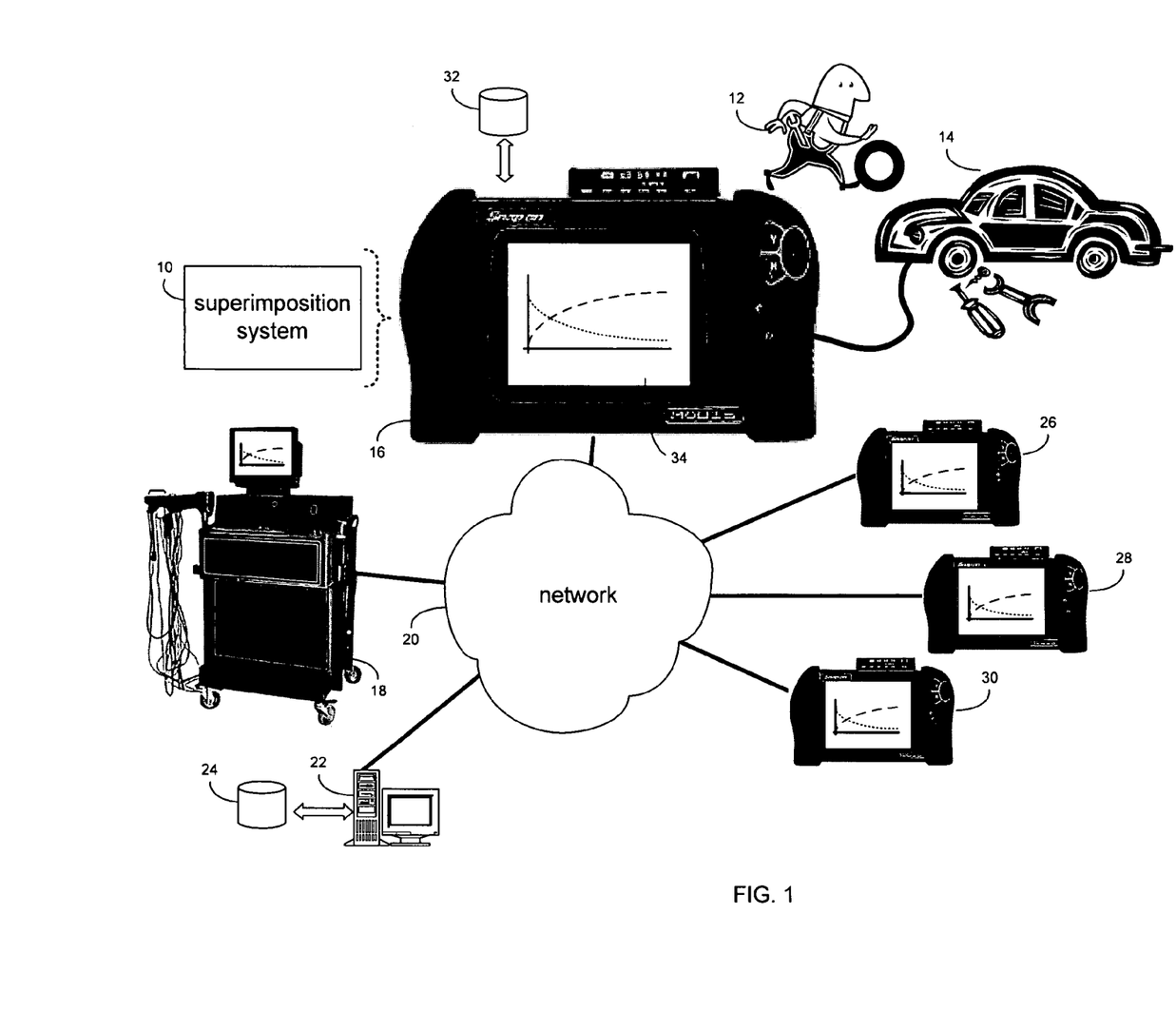
FIG. 1 is a diagrammatic view of a superimposition system coupled to a distributed computing network.

Referring to FIG. 1, there is shown a superimposition system 10 that allows a technician 12 to superimpose data from multiple data sources when analyzing a device/system. In this example, the device/system being analyzed by technician 12 is a motor vehicle 14 (e.g., a car, truck or motorcycle). However, it is understood that superimposition system 10 may be used with any device/system (e.g., various electronic devices, air handling systems, security system and power control systems, for example) for which data analysis is needed.

Superimposition system 10 typically resides on and is executed by handheld scanning device 16 (e.g., a Snap-On MODIS Modular Diagnostic Information System™) or a modular diagnostic system 18 (e.g., a Sun Diagnostics SMP-4000 Modular Platform™).

Scanning device 16 (or diagnostic system 18) maybe a stand-alone system (i.e., a system that locally stores any required customer data) or a network-based system (i.e., a system that remotely stores at least a portion of any required customer data). If a networked system, scanning device 16 (or diagnostic system 18) may use network 20 to access remote server 22 that remotely stores at least a portion of the customer data (which will be discussed below in greater detail) on a remote storage device 24 (e.g., a hard disk drive, a tape drive, an optical drive, a RAID array, a random access memory (RAM), or a read-only memory (ROM), for example). Scanning device 16 (or diagnostic system 18) may be hardwired (e.g., unshielded twisted pair, coaxial cable, or fiber-optic cable, for example) or wirelessly connected (e.g., 802.11a, 802.11b, or 802.11g, for example) to network 20.

Remote server 22 may be a web server running a network operating system, such as Microsoft Window 2000 Server™, Novell Netware™, or Redhat Linux™. Typically, remote server 22 also executes a web server application, such as Microsoft IIS™, Novell Webserver™, or Apache Webserver™, that allows for HTTP (i.e., HyperText Transfer Protocol) access to remote server 22 via network 20. Further, if scanning device 16 (or diagnostic system 18) is networked, additional devices 26, 28, 30 may also be connected to remote server 22 (via network 20), allowing multiple systems 16, 26, 28, 30 to share the customer data stored on remote server 22.

The instruction sets and subroutines of superimposition system 10, which are typically stored on a storage device 32 coupled to scanning device 16 (or diagnostic system 18), are executed by one or more processors (not shown) and one or more memory architectures (not shown) incorporated into scanning device 16 (or diagnostic system 18). Storage device 32 may be a hard disk drive, a tape drive, an optical drive, a RAID array, a random access memory (RAM), or a read-only memory (ROM), for example.

Figure 2:
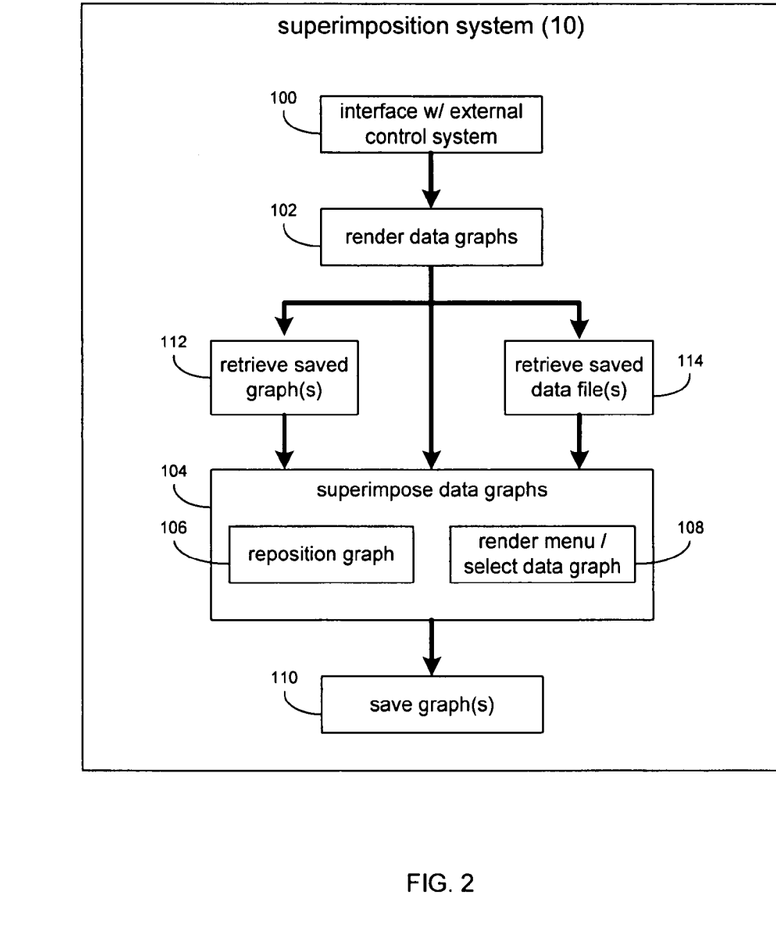
FIG. 2 is a flow chart of the superimposition system of FIG. 1.

Referring also to FIG. 2, when using superimposition system 10, technician 12 interfaces 100 scanning device 16 (or diagnostic system 18) with the control system of the device/system (e.g., motor vehicle 14). As discussed above, while the device/system is shown to be a motor vehicle 14, it is understood that superimposition system 10 may be used with other types of devices/systems, such as various electronic devices, air handling systems, security system and power control systems, for example.

Figure 3:
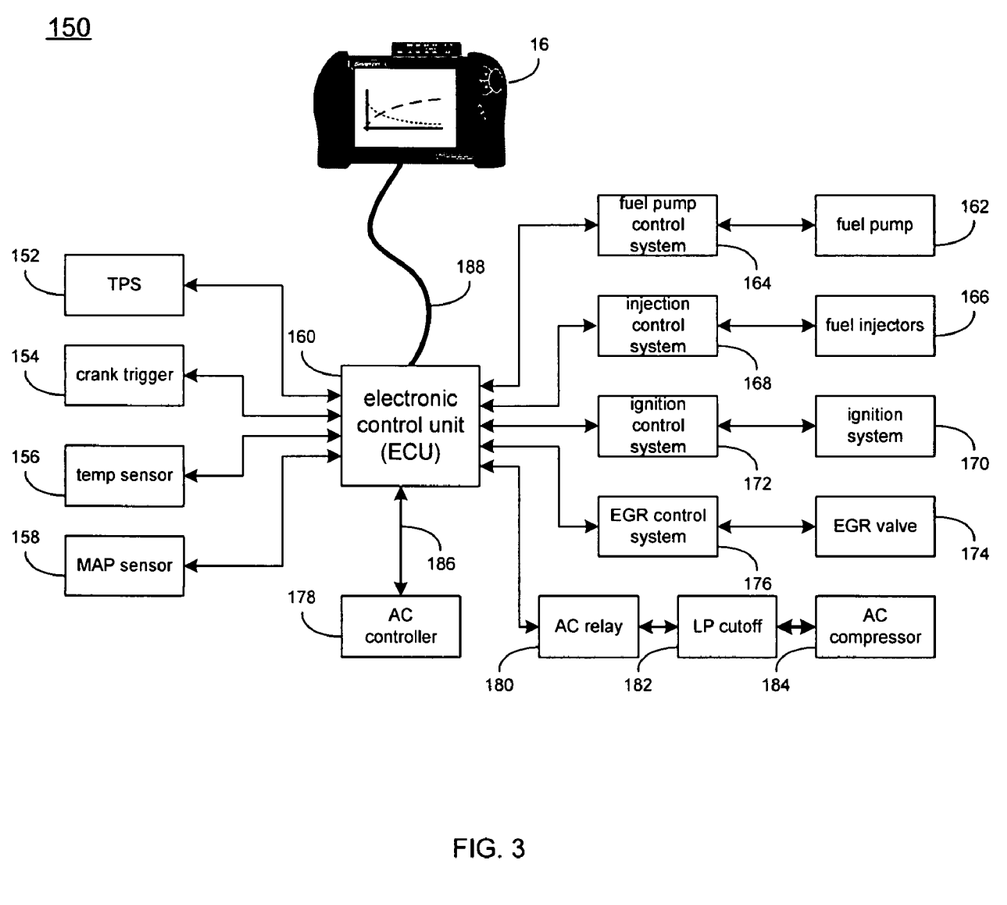
FIG. 3 is a schematic diagram of a motor vehicle interfaced with the superimposition system of FIG. 1.

Referring also to FIG. 3, there is shown a schematic-representation 150 of the electrical system of motor vehicle 14, illustrating the interconnection of various components, such as: throttle position sensor (TPS) 152; crank trigger 154; engine temperature sensor 156; manifold absolute pressure (MAP) sensor 158; electronic control unit (ECU) 160; fuel pump 162; fuel pump control system 164; fuel injectors 166; injection control system 168; ignition system 170; ignition control system 172; emission gas recirculation (EGR) valve 174; EGR control system 176; air conditioning (AC) controller 178; AC relay 180; low pressure (LP) cutoff 182; and AC compressor 184, for example.

The components shown in schematic diagram 150 may be electrical components (e.g., temp sensor 156), electrical-mechanical components (e.g., AC relay 180), or a portion of a wiring harness (e.g., wiring harness 186).

As discussed above, the control system (e.g., ECU 160) of motor vehicle 14 is interfaced with scanning device 16 (or diagnostic system 18) so that data stored on ECU 160 may be retrieved by scanning device 16 (or diagnostic system 18). Typically, scanning device 16 (or diagnostic system 18) is interfaced to ECU 160 using a multiconductor cable 188 that is temporarily coupled to a service port (not shown) on the wiring harness of motor vehicle 14. However, other interface techniques (e.g., 802.11a, 802.11b, 802.11g, and infrared coupling, for example) are foreseeable and considered to be within the scope of this disclosure.

Typically, during operation of motor vehicle 14, the sensing components (e.g., TPS 152; crank trigger 154; engine temperature sensor 156; and/or MAP sensor 158) provide data to ECU 160. Additionally, other components of the system (e.g., EGR valve 174) may also provide a status feedback signal (i.e., data) to ECU 160. These various data signals are stored (on a temporary or permanent basis) on memory storage devices (e.g., registers, RAM architectures and/or ROM architectures, not shown) within ECU 160. For example, data within a normal operating range may be temporarily stored, and data outside of the normal operating range (e.g., excessively-high engine RPM, excessively-high vehicle speed, extreme overheating conditions and/or extended low oil pressure conditions, for example) may be stored for warranty/diagnostic purposes.

Figure 4:
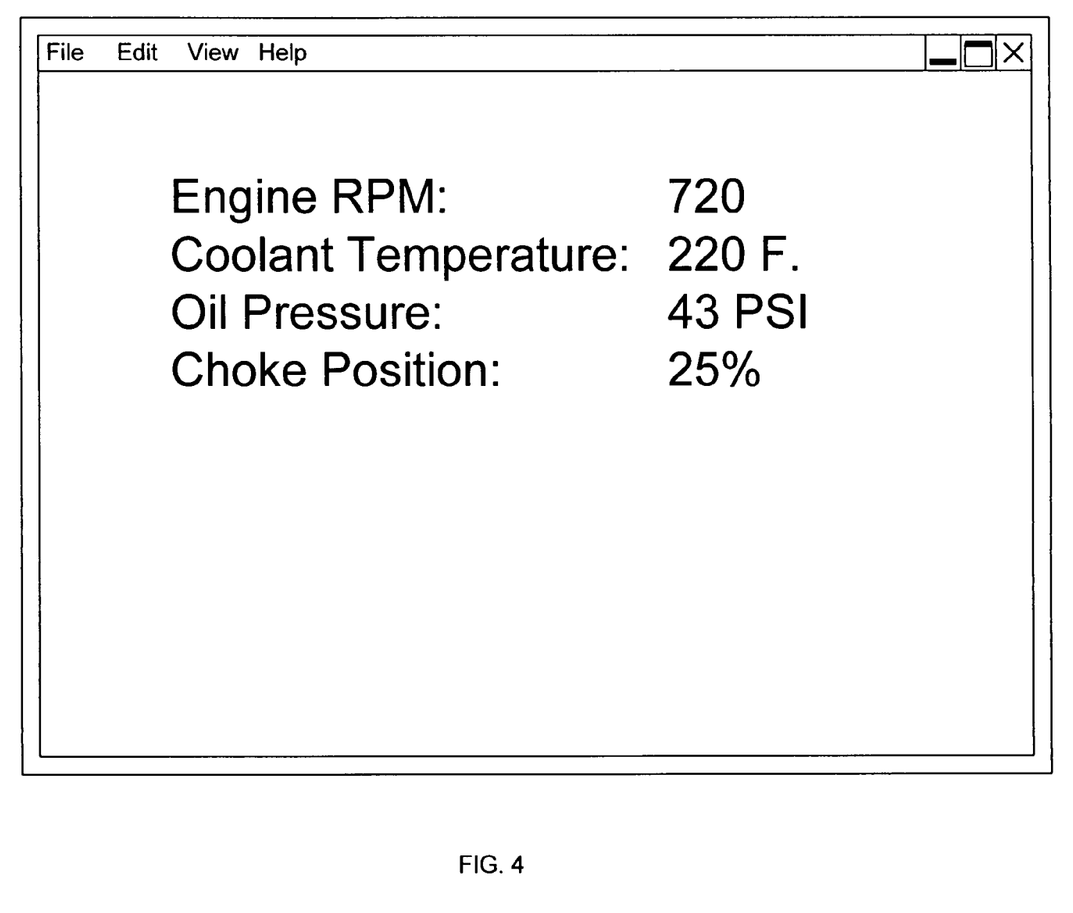
FIG. 4 is a diagrammatic view of a display screen rendered by the superimposition system of FIG. 1.

When data signals are stored on ECU 160, the data signals are typically downloadable (via e.g., cable 188 coupled to the wiring harness service port, not shown) and displayable on display device 34 of scanning device 16 (or diagnostic system 18). These data signals maybe be presented as text-based data (as shown in FIG. 4) or graphically.

Figure 5:
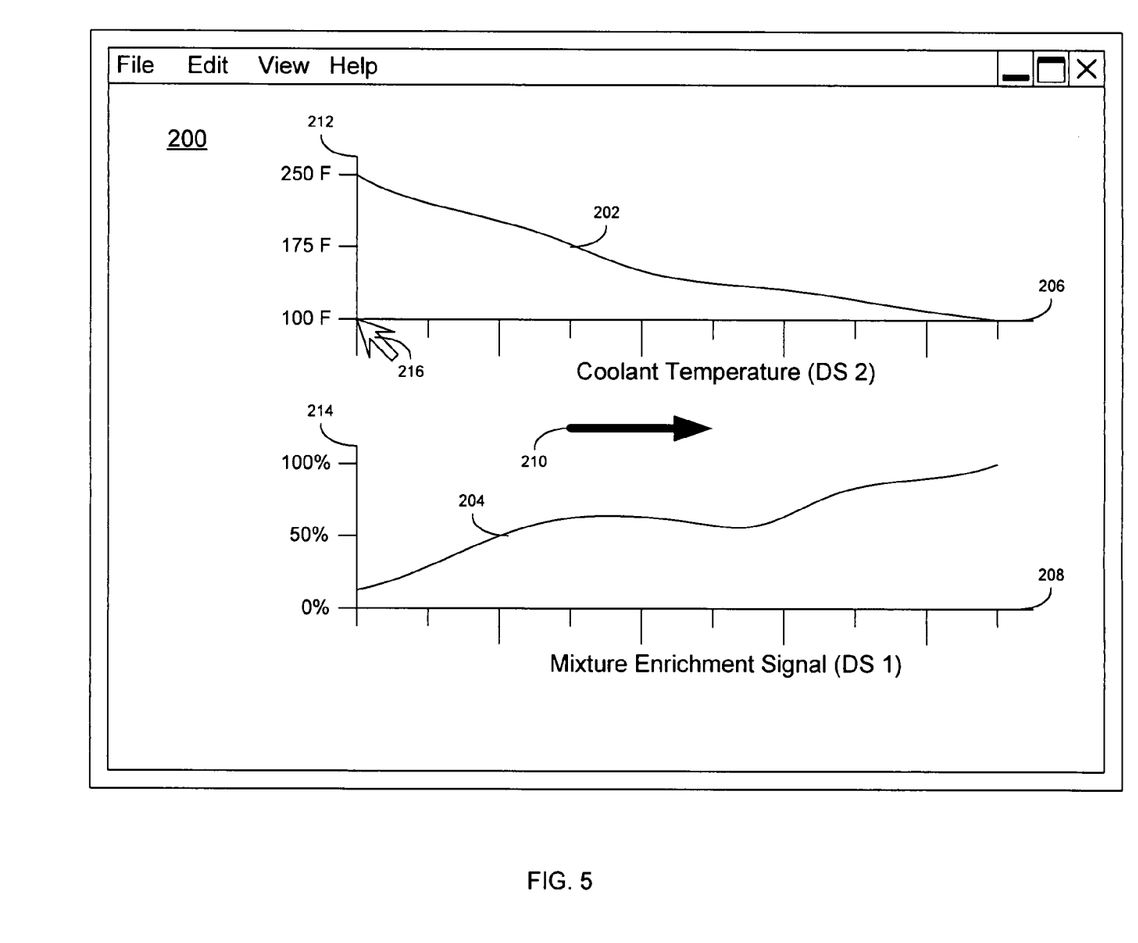
FIG. 5 is a diagrammatic view of a display screen rendered by the superimposition system of FIG. 1.

Referring also to FIG. 5, there is shown a typical graphical display 200 rendered 102 on display device 34 (e.g., a CRT screen, an LCD screen, an LED display, or an LCD display, for example) of scanning device 16 (or diagnostic system 18). When displaying data graphically, the data signals are typically plotted on an X-Y coordinate grid in which the X-axis corresponds to time and the Y-axis corresponds to the values being measured. For example, graphical display 200 includes two separate graphs, the first graph being an "Coolant Temperature" graph 202 and the second graph being a "Mixture Enrichment Signal" graph 204. For both graphs 202, 204, the x-axis 206, 208 (respectively) corresponds to time, and the line representing the data signal scrolls to the right (in the direction of arrow 210) as time passes.

When configuring superimposition system 10, the granularity of the x-axis increments may be varied to provide the desired level of historical data. For example, if the horizontal resolution is set relatively low (e.g., each increment equals one minute of time), graphs 202, 204 would provide technician 12 with just over nine minutes of historical data. However, if the horizontal resolution is set relatively high (e.g., each increment is equal to one second), graphs 202, 204 would only provide technician 12 with just over nine seconds of data.

Accordingly, when monitoring data signals that vary slowly (e.g., coolant temperature signals), it may be desirable to utilize a relatively low horizontal resolution, thus expanding the time axis (i.e., the x-axis) and the enhancing the ability to track variables that change slowly with respect to time (i.e., have a lower mathematical derivative).

Conversely, when monitoring data signals that vary quickly (e.g., ignition signals), it may be desirable to utilize a relatively high horizontal resolution, thus shortening the time axis (i.e., the x-axis) and the enhancing the ability to track signals that change quickly with respect to time (i.e., have a higher mathematical derivative).

As graph 202 is a time-based graphical representation of the coolant temperature, the y-axis 212 of graph 202 is divided into degree-based increments. As graph 204 is a time-based graphical representation of the mixture enrichment signal, the y-axis 214 of graph 204 is divided into percentage-based increments.

Quite often, multiple data signals are loosely interrelated. For example, the "Coolant Temperature" signal (i.e., graph 202) is interrelated to the Mixture Enrichment Signal" (i.e., graph 204), in that when an engine is cold (i.e., the coolant temperature is low), the air/fuel mixture must be enriched (i.e., more fuel) to ensure adequate performance during the warm-up period. Accordingly, when the "Coolant Temperature" signal is low, the "Mixture Enrichment Signal" is typically high. And, conversely, when the "Coolant Temperature" signal is high, the "Mixture Enrichment Signal" is typically low.

It may be desirable to superimpose a first data graph (e.g., data graph 202) onto a second data graph (e.g., data graph 204) so that the relationship of the two signal can be further examined. Accordingly, superimposition system 10 allows technician 12 to superimpose 104 multiple data graphs. This superimposition may occur in various ways.

Figure 6:
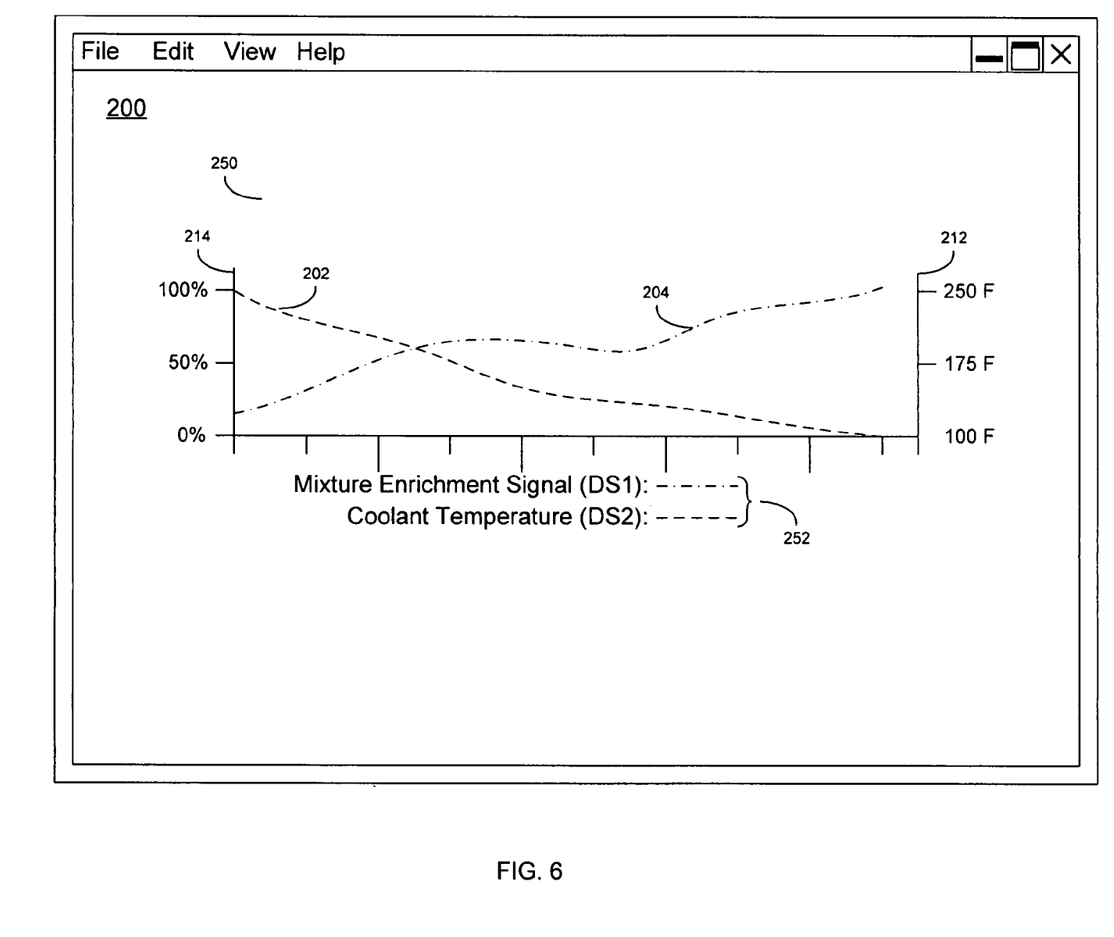
FIG. 6 is a diagrammatic view of a display screen rendered by the superimposition system of FIG. 1.

For example, using pointer 216 controlled by a pointing device (e.g., a mouse, trackball, or touch screen device, not shown), technician 12 may select (e.g., click on) the appropriate graph to be superimposed and reposition 106 (i.e., "drag") the selected data graph onto another data graph, creating superimposed data graph 250, as shown in FIG. 6. For example, technician 12 may click on data graph 202 and reposition 106 data graph 202 onto data graph 204. Typically, superimposition system 10 will "snap" the repositioned data graph to the appropriate position on the base graph so that the axes origin of each data graph are aligned.

Superimposed data graph 250 typically includes a legend 252 that correlates the name of the data graph with the line-type used to represent that data graph. For example, the "Coolant Temperature" data graph 202 is shown using a "- - - -" line type and the "Mixture Enrichment Signal" data graph 204 is shown using a "- . - . -" line type.

When superimposing multiple data graphs (e.g., data graphs 202, 204), the resolution of the x-axis of both data graphs (i.e., x-axes 206, 208, respectively) are ideally the same, as this allows for the graphical syncing of various time-based events. However, the resolution/incrementation of the y-axis of each graph may vary. Continuing with the above-stated example, once data graph 202 is superimposed onto data graph 204, the resulting superimposed data graph 250 may include multiple y-axes (e.g., axes 212, 214) to accommodate data graphs having different y-axis resolution or incrementation. Alternatively, a single y-axis may be used that is incremented in multiple ways (e.g., degrees and percentages, not shown).

Figure 7:
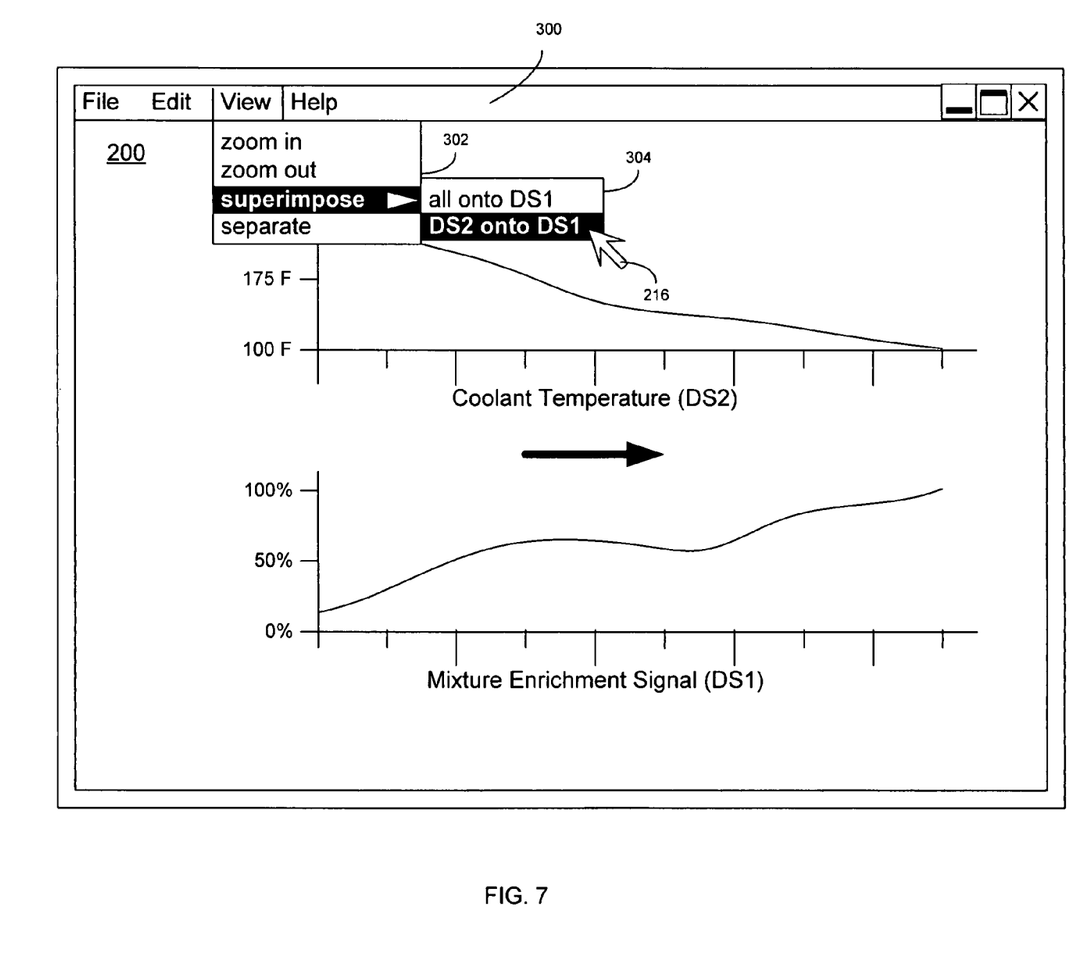
FIG. 7 is a diagrammatic view of a display screen rendered by the superimposition system of FIG. 1.

Referring to FIG. 7, in addition to the repositioning method described above, superimposed data graph 250 made be generated via menu-driven commands selected from a drop-down menu. For example, if technician 12 wanted to superimpose data graph 202 onto data graph 204, technician 12 may select e.g., "View" from title bar 300 of graphical display 200 using pointer 216. Superimposition system 10 would then render 108 drop-down menu 302 and technician 12 may select "Superimpose", resulting in the rendering of a secondary drop-down menu 304. If the user selects e.g., "DS2 onto DS1", data graph 202 would be superimposed onto data graph 204, resulting in the generation of the above-described superimposed data graph 250. Typically, secondary drop-down menu 304 includes sufficient menu items to cover various superimposition options, such as a menu item that would superimpose all data graphs onto a single data graph, or only a portions of data graphs onto a single data graph.

Figure 8:
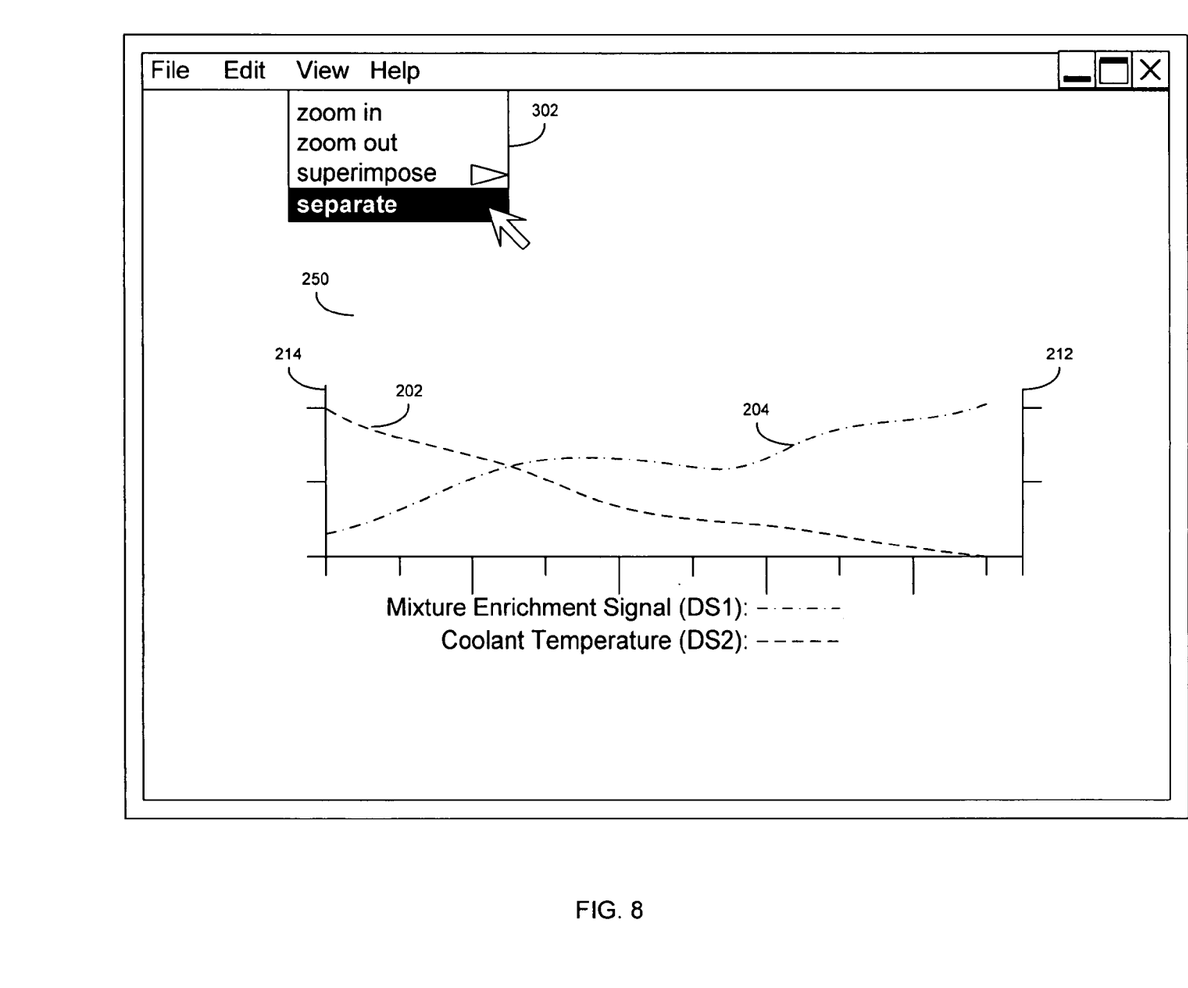
FIG. 8 is a diagrammatic view of a display screen rendered by the superimposition system of FIG. 1.

Referring also to FIG. 8, technician 12 may also separate superimposed data graphs (e.g., superimposed data graph 250) by selecting "separate" on drop-down menu 302. This action, in turn, will result in the splitting of superimposed data graph 250 into separate data graphs (e.g., data graphs 202, 204).

Figure 9:
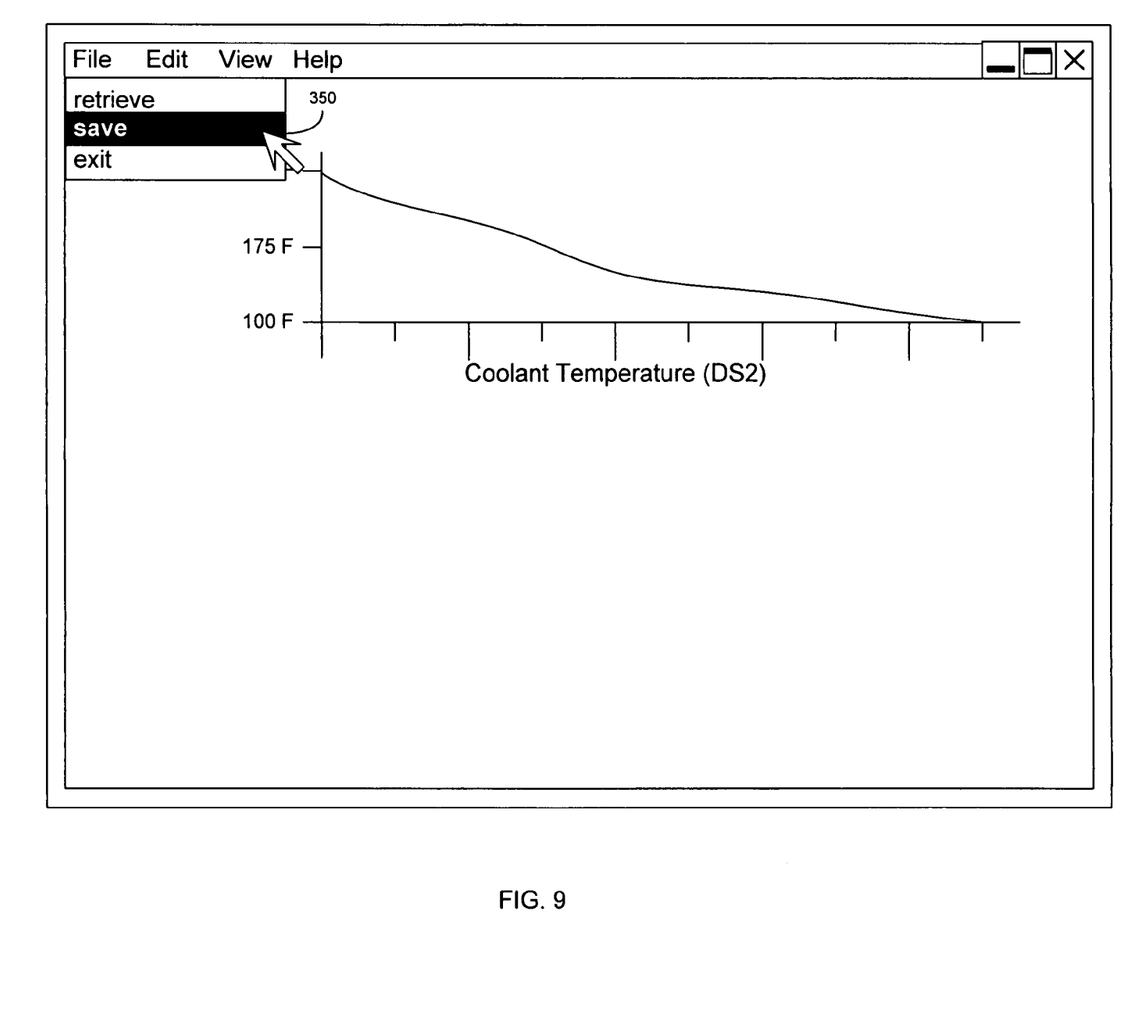
FIG. 9 is a diagrammatic view of a display screen rendered by the superimposition system of FIG. 1.

In addition to rendering and displaying data graphs based on data signals retrieved from ECU 160, superimposition system 10 allows technician 12 to save 110 and retrieve 112 various data graphs. Referring also to FIG. 9, by selecting "save" from drop-down menu 350 (rendered by superimposition system 10), technician 12 may save 110 one or more of the data graphs shown on graphical display 200. These data graphs may be saved on local storage device 32 or (if scanning device 16 or diagnostic system 18 are networked) on remote storage device 24.

Further, by selecting "retrieve" from drop-down menu 350, technician 12 may retrieve 112 the data graphs previously saved, thus allowing technician 12 to compare the data graph of previously recorded data signals to the data graph of currently available data signals. In addition to being able to retrieve previously-recorded data graphs, technician 12 may retrieve 114 diagnostic data graphs for a particular component of vehicle 14. For example, if technician 12 suspected that e.g., the ignition control system 172 was malfunctioning due to a suspect feedback signal being provided to ECU 160, technician 12 may retrieve 114 (from local storage device 32 or remote storage device 24) a diagnostic data graph (i.e., a baseline data file) that graphically displays the ideal feedback signal that should be provided to ECU 160 from ignition control system 172.

As described above, this diagnostic data graph may then be superimposed over the actual data graph of the feedback signal (provided by ignition control system 172) so that the technician can compare the two signals and diagnose the problem.

While only two data graphs are shown to be included in graphical display 200, this is for illustrative purposes only, as the number of individual data graphs rendered may be increased based on the requirements of technician 12. Additionally, as superimposition system 10 is capable of displaying these additional data graphs, they may also be superimposed upon other graphs. For example, if superimposition system 10 rendered eight individual data graphs, seven of these data graphs may be superimposed upon the eighth graph, resulting on one graph displaying the information of the eight individual data graphs.

While the two data graphs included in superimposed data graph 250 are shown using different line types (one a dashed line and the other a dash-dot line), other configurations are possible. For example, the two data graphs may be shown using different colors (e.g., red and blue), thus allowing for easy differentiation between the data graphs.

The embodiments described herein may include or be utilized with any appropriate voltage or current source, such as a battery, an alternator, a fuel cell, and the like, providing any appropriate current and/or voltage, such as about 12 Volts, about 42 Volts and the like.

The embodiments described herein may be used with any desired system or engine. Those systems or engines may comprise items utilizing fossil fuels, such as gasoline, natural gas, propane and the like, electricity, such as that generated by battery, magneto, fuel cell, solar cell and the like, wind and hybrids or combinations thereof. Those systems or engines may be incorporated into other systems, such as an automobile, a truck, a boat or ship, a motorcycle, a generator, an airplane and the like.

A number of implementations have been described. Nevertheless, it will be understood that various modifications may be made. Accordingly, other implementations are within the scope of the following claims.

What is claimed is:

1. A machine-implemented method for rendering diagnostic information, the method comprising:
   rendering, on a display device, a first data graph concerning vehicular diagnostic data received from a first data source;
   rendering, on the display device, a second data graph concerning vehicular diagnostic data received from a second data source; and
   on the display, superimposing the second data graph onto the first data graph to generate a superimposed data graph.

2. The method of claim 1, further comprising:
   rendering, on the display device, additional data graphs, each of which concerns data received from an additional data source; and
   superimposing the additional data graphs onto the first data graph.

3. The method of claim 1, wherein the x-axis of the first data graph, the x-axis of the second data graph, and the x-axis of the superimposed data graph are each divided into increments having a common time unit value.

4. The method of claim 1, where the y-axis of the first data graph is divided into increments having a first increment unit value, the y-axis of the second data graph is divided into increments having a second increment unit value, and the y-axis of the superimposed data graph is divided into increments having both the first increment unit value and the second increment unit value.

5. The method of claim 1, wherein superimposing the second data graph includes:
   repositioning the second data graph onto the first data graph to generate the superimposed data graph.

6. The method of claim 1, wherein superimposing the second data graph includes:
   rendering a menu structure, on the display device, that allows the user to select the second data graph for superimposition onto the first data graph to generate the superimposed data graph.

7. The method of claim 1, further comprising interfacing with an external control system that collects the data received from the first and second data sources.

8. The method of claim 7, wherein the external control system is an electronic control unit of a motor vehicle.

9. The method of claim 8, wherein at least one of the data sources is a sensor incorporated into the motor vehicle.

10. The method of claim 1, further comprising:
    storing one or more of the data graphs on a data store.

11. The method of claim 10, wherein the data store is a local data store.

12. The method of claim 10, wherein the data store is a remote data store.

13. The method of claim 10, further comprising:
    retrieving one or more of the data graphs from the data store.

14. The method of claim 1, wherein:
    the first data source is a baseline data file for a specific data sensor; and
    the second data source is an actual data source from the specific data sensor.

15. The method of claim 14, further comprising:
    retrieving the baseline data file from a data store.

16. The method of claim 15, wherein the data store is a local data store.

17. The method of claim 15, wherein the data store is a remote data store.

18. A computer program product residing on a computer readable medium having a plurality of instructions stored thereon which, when executed by the processor, cause that processor to:
    render, on a display device, a first data graph concerning data received from a first data source;
    render, on the display device, a second data graph concerning data received from a second data source; and
    on the display device, superimpose the second data graph onto the first data graph to generate a superimposed data graph.

19. The computer program product of claim 18, further comprising instructions for:
    rendering, on the display device, additional data graphs, each of which concerns data received from an additional data source; and
    superimposing the additional data graphs onto the first data graph.

20. The computer program product of claim 18, wherein the x-axis of the first data graph, the x-axis of the second data graph, and the x-axis of the superimposed data graph are each divided into increments having a common time unit value.

21. The computer program product of claim 18, wherein the y-axis of the first data graph is divided into increments having a first increment unit value, the y-axis of the second data graph is divided into increments having a second increment unit value, and the y-axis of the superimposed data graph is divided into increments having both the first increment unit value and the second increment unit value.

22. The computer program product of claim 18, wherein the instructions for superimposing the second data graph include instructions for:
    repositioning the second data graph onto the first data graph to generate the superimposed data graph.

23. The computer program product of claim 20, wherein the instructions for superimposing the second data graph include instructions for:
    rendering a menu structure, on the display device, that allows the user to select the second data graph for superimposition onto the first data graph to generate the superimposed data graph.

24. The computer program product of claim 18, further comprising instructions for interfacing with an external control system that collects the data received from the first and second data sources.

25. The computer program product of claim 24, wherein the external control system is an electronic control unit of a motor vehicle.

26. The computer program product of claim 25, wherein at least one of the data sources is a sensor incorporated into the motor vehicle.

27. The computer program product of claim 18, further comprising instructions for:
   storing one or more of the data graphs on a data store.

28. The computer program product of claim 27, wherein the data store is a local data store.

29. The computer program product of claim 27, wherein the data store is a remote data store.

30. The computer program product of claim 27, further comprising instructions for:
   retrieving one or more of the data graphs from the data store.

31. The computer program product of claim 18, wherein:
   the first data source is a baseline data file for a specific data sensor; and
   the second data source is an actual data source from the specific data sensor.

32. The computer program product of claim 31, further comprising instructions for:
   retrieving the baseline data file from a data store.

33. The computer program product of claim 32, wherein the data store is a local data store.

34. The computer program product of claim 32, wherein the data store is a remote data store.

35. A machine-implemented method for rendering diagnostic information, the method comprising:
   rendering, on a display device, a plurality of data graphs, each of which concerns vehicular diagnostic data received from a different data source;
   receiving a user selection selecting a single data graph from the plurality of data graphs, and
   on the display device, superimposing at least a portion of the remaining plurality of data graphs onto the selected single data graph to generate a superimposed data graph.

36. The method of claim 35, wherein superimposing the second data graph includes:
   rendering a menu structure, on the display device, that allows the user to select the selected single data graph and the at least a portion of the remaining plurality of data graphs to generate a superimposed data graph.

37. A computer program product residing on a computer readable medium having a plurality of instructions stored thereon which, when executed by the processor cause that processor to:
   render, on a display device, a plurality of data graphs, each of which concerns data received from a different data source;
   receive a user selection selecting a single data graph from the plurality of data groups, and
   on the display device, superimpose at least a portion of the remaining plurality of data graphs onto the selected single data graph to generate a superimposed data graph.

38. The computer program product of claim 37, wherein the instructions for superimposing at least a portion of the remaining plurality of data graphs include instructions for:
   rending a menu structure, on the display device, that allows the user to select the selected single data graph and the at least a portion of the remaining plurality of data graphs to generate a superimposed data graph.

39. A superimposed system comprising:
   a display device for displaying a first data graph concerning data received from a first data source, and a second data graph concerning data received from a second data source; and
   a selection device for receiving a user selection requesting the superimposition of the second data graph onto the first data graph to generate a superimposed data graph on the display device.

40. The system of claim 39, wherein:
   the display device is configured to display additional data graphs, each of which concerns data received from an additional data source; and
   the selection device is configured to allow for the superimposition of the additional data graphs onto the first data graph.

41. The system of claim 39, further comprising:
   an interface device for interfacing with an external control system that collects the data received from the first and second data sources.

42. The system of claim 39, further comprising:
   a data store for storing one or more of the data graphs.

43. The method of claim 1, wherein:
   the first data graph is an ideal signal of a vehicle component; and
   the second data graph is a measured signal of the vehicle component.

44. The product of claim 18, wherein:
   the first data graph is an ideal signal of a vehicle component; and
   the second data graph is a measured signal of the vehicle component.

* * * * *